Patented May 21, 1940

2,201,170

UNITED STATES PATENT OFFICE 2,201,170

SECONDARY THIOAMIDES AND PROCESS OF PREPARING THEM

William Edward Hanford, Wilmington, Del., assignor to E. I. du Pont de Nemours & Company, Wilmington, Del., a corporation of Delaware No Drawing. Application September 15, 1938,
Serial No. 230,141

11 Claims. (Cl. 260—551)

This invention relates to a new process for preparing thioamides, and to certain of the products. The present application is a continuation-in-part of my co-pending application Serial Number 137,149, filed April 15, 1937.

The chief object of the present invention is the development of a satisfactory and economical process for the manufacture of secondary amides of carbothionic acids in which the thiocarbonyl groups are attached to carbon. A further object is to prepare such amides from hydrogen sulfide. Another object is to prepare a group of thioamides which are themselves new and useful. Other objects will appear from the description which follows.

The objects of the invention are accomplished by reacting hydrogen sulfide with a nitrile and with an amine in which at least one amino group is primary and attached to an aliphatic carbon atom, the reacting groups of polyfunctional reactants being separated by a chain of at least two carbon atoms contiguous therewith and in the case of polyfunctional nitrile reactant preferably by a chain of at least three carbon atoms, continuing the reaction until the evolution of ammonia has substantially ceased, and isolating the carbothionamide formed. The reaction which takes place with a mononitrile and monoamine, the simplest combination, is as follows. The more complex combinations can be deduced therefrom. The R's represent any monovalent organic radical.

$$R^1CN + H_2S + H_2N-R^2 \rightarrow R^1-CS-NH-R^2 + NH_3$$

While I do not wish to be bound by any theory, I believe this reaction is a summation of several others which take place (a) the formation, first, of an amidine between the nitrile and amine, (b) the formation, next, of an unstable hydrogen sulfide addition compound, (c) the decomposition of the latter into ammonia and the carbothionamide

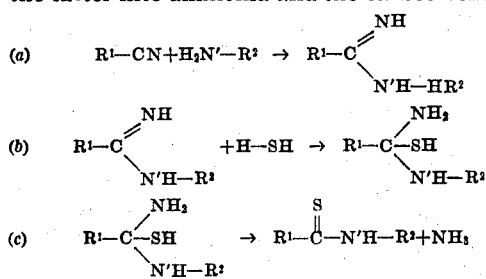

According to this theory the ammonia nitrogen comes from the nitrile.

By the above process, it is possible to prepare a wide variety of useful secondary carbothionamides in which the thiocarbonyl group or groups are attached to carbon. These products either have not previously been known, or, if known, have been obtainable only by complicated and/or expensive synthetic methods. For instance in addition to (1) the simple monomeric carbothionamides from a mononitrile and a monoamine illustrated in the above formula, it is possible to prepare (2) monomeric amides of monocarbothionic acids from mononitriles, and amines having two or more primary aliphatic amino groups, (3) monomeric amides of polycarbothionic acids from primary aliphatic monoamines and most polynitriles, (4) monomeric surface active carbothionamides from the combinations monoamine-mononitrile, monoamine-polynitrile, and mononitrile-polyamine, one of the reactants containing a polar group, (5) thiolactams by the intramolecular reaction of monoamino-mononitriles in which the amine and nitrile groups are separated by a chain of 3, 4, or 5 atoms, (6) polymeric carbothionamides by the intermolecular reaction of monoamino-mononitriles in which the amine and nitrile groups are separated by 5 or more chain atoms, (7) polymeric carbothionamides by reaction of polynitriles with polyamines. Hydrogen sulfide is of course a necessary third reactant in all these combinations.

The present application, in its product aspects, is concerned only with certain of the compounds of types (1) and (2) above. Those of type (3) while a species of my generic invention are specifically the joint invention of Paul L. Salzberg and myself and are described and claimed in our copending application Serial Number 230,144, filed of even date herewith. Those of type (4) are specifically described and claimed in my copending application Serial Number 230,142, filed of even date herewith. The preparation of products of type (5) while a species of my generic invention, is specifically the invention of Paul S. Pinkney and is claimed by him in his copending application Serial Number 199,988, filed April 4, 1938. Those of type (6) are described and claimed generically, and those of type (7) generically and specifically, in my copending application Serial Number 230,143, filed of even date herewith. By reference herein to these several copending applications, the disclosures therein on the preparation, properties, and uses of the specific types of carbothionamides with which each deals are hereby made a part hereof. The present application will describe the generic process invention with the preparation chiefly of type (1).

In a preferred mode of carrying out the present invention, one mol of nitrile is mixed in a pressure vessel with about 1.1 mols of amine, and these materials are dissolved in a solvent such as ethyl or n-butyl alcohol. This solution is cooled externally to 0–5° C. with an ice-salt bath and saturated with hydrogen sulfide. The reaction vessel is then closed and the mixture heated for about 6 to 10 hours at about 100–150° C., the time of heating varying inversely with the temperature. The vessel is then cooled and opened, the solvent distilled off, and the product isolated by fractional distillation or by crystallization from an appropriate solvent. The yield is good and the product of high purity.

The reaction may also be carried out under atmospheric pressure by passing a steady stream of hydrogen sulfide through the reaction mixture while the latter is heated under reflux to the boiling point of the solvent, the introduction of hydrogen sulfide being continued until substantially no more is absorbed. Under these conditions approximately the same yield is obtained, but more hydrogen sulfide is required. This modification of the process may be desirable, however, when pressure equipment is not available, or when large scale operation with a suitable hydrogen sulfide recovery system is contemplated.

The more detailed practice of the invention is illustrated by the following examples, wherein parts given are by weight. There are of course many forms of the invention other than these specific embodiments.

EXAMPLE I
*N-n-dodecylthiobenzamide*

Twenty-one (21) parts of benzonitrile, 45 parts of n-dodecylamine, and 50 parts of ethyl alcohol were placed in a pressure vessel and saturated with hydrogen sulfide, the pressure vessel being cooled in an ice bath. The vessel was sealed and heated for 8 hours at 100° C., then opened and the alcohol evaporated off. The brown oil which remained was boiled with water for a few minutes to dissolve any thiobenzamide, the oil separated from the hot water and dissolved in low-boiling gasoline, and this solution cooled. Yellow plates of N-n-dodecylthiobenzamide of the formula

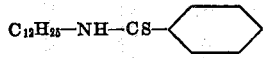

melting at 44–45° C., were obtained. On analysis, this material was found to contain 10.29% sulfur and 4.68% nitrogen, whereas the calculated amounts for the compound of the formula given are 10.49% and 4.59%, respectively.

EXAMPLE II
*N-isobutylthiolauramide*

Twenty (20) parts of isobutylamine, 36.2 parts of lauronitrile and 50 parts of ethyl alcohol were placed in a pressure vessel immersed in an ice bath, and the solution cooled and then saturated with hydrogen sulfide. The vessel was next sealed and heated for 8 hours at 100° C., after which it was opened and the alcohol evaporated off. The residual oil was dissolved in ether, and the ethereal solution extracted successively with water, dilute hydrochloric acid, and again with water. The ether was then evaporated off and the solid dried in vacuo over sulfuric acid. This product, obtained in about 80% yield, is N-isobutyl thiolauramide of the formula $C_4H_9-NH-CS-C_{11}H_{23}$. It melts at about 25° C. and had on analysis a sulfur content of 11.32% as compared to a calculated value of 11.81%.

EXAMPLE III
*N-isobutylthiobenzamide*

Twenty (20) parts of isobutylamine, 30.9 parts of benzonitrile and 50 parts of ethyl alcohol were placed in a pressure vessel immersed in an ice bath, and the solution saturated with hydrogen sulfide. The vessel was then sealed and heated for 8 hours at 100° C., after which it was opened and the alcohol evaporated off. The residual brown oil was then boiled with water, separated from the hot water, and dissolved in benzene, and the benzene solution was dried over sodium sulfate. The benzene was next distilled off and the residual oil purified by further distillation in vacuo. This product is N-isobutylthiobenzamide of the formula

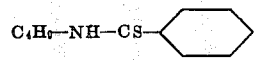

It boils at about 168° C./3 mm., is an oil at ordinary temperature, and had on analysis a sulfur content of 16.80% as compared to the calculated value of 16.58%.

EXAMPLE IV
*N-isobutylthiocaprylamide*

Thirty (30) parts of isobutylamine, 37.5 parts of caprylonitrile and 25 parts of absolute ethyl alcohol were reacted as in Example III. The N-isobutylthiocaprylamide of the formula $$C_4H_9-NH-CS-(CH_2)_6CH_3$$

which was obtained boils at 172–177° C. at 3 mm. pressure and had on analysis a sulfur content of 14.65% as compared to the calculated value of 14.88%. Substantially the same results were obtained when 80 parts of isobutylamine and 125 parts of caprylonitrile were reacted in the same manner in the presence of 300 parts of ethyl alcohol.

EXAMPLE V
*N-n-dodecylthiobenzamide*

In a reaction vessel equipped with a reflux condenser, a stirrer, and a gas inlet tube were placed 103 parts of benzonitrile, 203.5 parts of n-dodecylamine and 500 parts of ethyl alcohol. This solution was heated to boiling and hydrogen sulfide passed in for 16 hours. The alcohol was then distilled off, after which, on further distillation in vacuo, a brown oil boiling at about 235° C./3 mm. was obtained. It may be further purified as in Example I by crystallization from low-boiling gasoline. This product is N-n-dodecylthiobenzamide of the formula

It has the same properties as the product of Example I.

EXAMPLE VI
*1,6-bis-(thioacetylamino)hexane*

A solution of 13.3 parts of hexamethylenediamine and 8.2 parts of acetonitrile in 80 parts of ethanol in a pressure vessel was saturated at 0° C. with hydrogen sulfide. The pressure vessel was sealed, heated at 100° C. for eight hours, cooled, opened, and the clear yellow solution poured into 300 parts of cold water. The white crystalline precipitate thus obtained was collected on a filter, washed with cold water, and air-dried. This compound is 1,6-bis-(thioacetylamino)hexane of the formula $CH_3CS-NH-(CH_2)_6-NH-CS-CH_3$. After crystallization from ethanol, it melts at 99–100° C. and had on analysis a sulfur content of 26.94% as compared to the calculated value of 27.59%.

EXAMPLE VII
*N,N'-dicyclohexyldithioadipamide*

A solution of 26.8 parts of cyclohexylamine and 10.8 parts adiponitrile in 90 parts of ethanol was placed in an autoclave, cooled to about 5° C. and saturated with hydrogen sulfide. The autoclave was then sealed and heated with stirring at 100–110° C. for eight hours, after which it was cooled, opened, and the contents poured into twice their volume of cold water. The water-insoluble material which separated was taken up with ether, the ether evaporated off, the oily residue dissolved in methanol, water added until the solution became turbid and the mixture then cooled and stirred. N,N'-dicyclohexyldithioadipamide of the formula

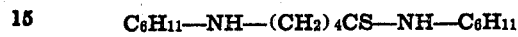
$C_6H_{11}$—NH—$(CH_2)_4CS$—NH—$C_6H_{11}$ separated as a white crystalline product, which was filtered off and purified by crystallization from methanol. The pure product melts at 168–168.5° C. It had on analysis a sulfur content which checked with the calculated value within experimental error.

The following additional carbothionamides have been prepared by the same general technique of the above examples:

if the latter, mono- or polycyclic; saturated or unsaturated; and substituted or not by groups other than those taking part in the reaction. Specific compounds suitable for use in the process include the following:

Nitriles of—

| Monobasic acids | Polybasic acids |
|---|---|
| Benzonitrile | Succinonitrile |
| Lauronitrile | Adiponitrile |
| Caprylonitrile | Sebaconitrile |
| Acetonitrile | Glutaronitrile |
| 6-aminocapronitrile | β-methylglutaronitrile |
| Oleonitrile | Terephthalonitrile |
| Propionitrile | Isophthalonitrile |
| Isobutyronitrile | α,α'-dimethyladiponitrile |
| 10-aminocaprinitrile | Camphoronitrile |
| Capronitrile | Fumaronitrile |
| Palmitonitrile | β-ketopimelonitrile |
| Stearonitrile | Diphenic acid nitriles |
| Eicosonitrile | p,p'-Dicyanobenzophenone |
| Linoleonitrile | o-Phthalonitrile |
| p-Toluonitrile | |
| m-Methoxybenzonitrile | |
| p-Nitrotoluonitrile | |
| α-naphthonitrile | |

| Compound | Physical constants | Yield | Sulfur analysis | |
|---|---|---|---|---|
| | | | Calc. | Found |
| | | Per cent | Per cent | Per cent |
| N-benzylthiobenzamide | M. P. 78–80° C | 72.5 | 14.0 | 13.0 |
| N-n-octylthiobenzamide | B. P. 196–197/2 mm | 57.0 | 12.8 | 11.6 |
| N-isobutylthiooleamide | B. P. 236–238/4 mm | 51.0 | 9.0 | 8.0 |
| N,N'-di-n-octyldithioadipamide | M. P. 113–114° C | 85.0 | 15.2 | 15.4 |

In this process, a temperature range of 50 to 250° C. may in general be used, and temperatures above 250° C. are sometimes applicable. The process may be carried out under atmospheric or superatmospheric pressures. Inert diluents which are solvents for the reactants and solvents or non-solvents for the products will generally be employed to advantage. Suitable diluents include ethanol, butanol, pentanols, dioxan, acetone, toluene, xylene, benzene, and -methoxyethanol. The ratios of reactants given in the examples are not limiting. A slight excess of amine over that stoichiometrically required to react with the nitrile is preferable, but the process can also be operated with excess nitrile. A slight excess of hydrogen sulfide is preferably used in all cases.

By the present process, it is possible to react any mono- or polynitrile with any mono- or polyamine having at least one amino group which is primary and attached to an aliphatic carbon, (i. e., a carbon which is not a part of an aromatic ring) and to react any primary monoaminomononitrile (the amino group being attached to an aliphatic carbon) with itself—provided the reacting groups of those of these reagents that are polyvalent are separated by a chain of at least two carbon atoms, and in the case of a polyfunctional nitrile reactant preferably by a chain of at least three carbon atoms. The reactants may therefore be aromatic, aliphatic (including alicyclic), or heterocyclic; acyclic or cyclic, and

Amines

| Monoamines | Polyamines |
|---|---|
| n-Dodecylamine | Hexamethylenediamine |
| Isobutylamine | Decamethylenediamine |
| Benzylamine | Ethylenediamine |
| n-Octylamine | Trimethylenediamine |
| 6-carboxy-n-amylamine | Tetramethylenediamine |
| 9,10-octadecenylamine | α-methyltetramethylenediamine |
| Furfurylamine | Triglycoldiamine |
| Cyclohexylamine | γ,γ'-diaminodipropyl ether |
| Methylamine | Propylenediamine |
| Ethylamine | 2,3-diaminobutane |
| Isopropylamine | 1,4-cyclohexylenediamine |
| n-Butylamine | p-xylylenediamine |
| Isoamylamine | Hexadecamethylenediamine |
| n-Decylamine | |
| Cetylamine | |
| n-Octadecylamine | |
| Naphthmethylamine | |

Certain dinitriles in which the nitrile groups are separated by a chain of only two carbons, and o-phthalonitrile in particular, react with monoamines to form imidothioimides on which an imido hydrogen is replaced by the radical of the amine; such products, broadly speaking, may still be viewed as carbothionamides since they are thioacylamines. The presumable reaction is the intermediate formation of a cyanomonocarbothionamide, which then rearranges to the imidothiomide. To illustrate with o-phthalonitrile:

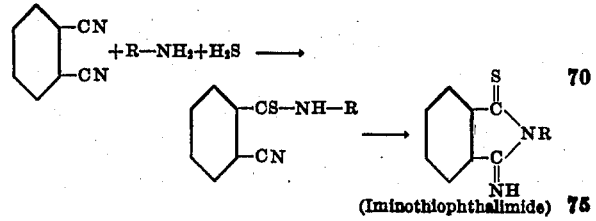
(Iminothiophthalimide)

R is any organic radical containing an aliphatic carbon adjacent to the amino group. Because of the peculiar behavior of polynitriles in which the nitrile groups are separated by chains of only two carbons, I prefer to employ, in making amides of polycarbothionic acids, polynitriles in which the nitriles are separated by longer chains, i. e., chains of three or more atoms. It is necessary to do this when a polymeric carbothionamide is desired.

Certain amines and nitriles are excluded from the scope of the invention as above defined for reasons of inoperativeness, inavailability of the reactant, etc., e. g., oxalonitrile, malononitrile, methylene diamine, etc. As indicated immediately above, polyfunctional nitrile reactions preferably have the nitrile group separated from the other reacting group by a chain of at least three carbon atoms.

In place of the pure nitriles and amines, there may be used any desired mixtures thereof, and mixtures of carbothionamides will be obtained. For example, I may employ the mixture of nitriles obtained by the catalytic dehydration of coconut oil acids in the presence of ammonia, in which case the products will be composed of about 2% thiocaproamides, 9% thiocaprylamides, 10% thiocapramides, 45% thiolauramides, 20% thiomyristamides, 5% thiopalmitamides, 9% thiostearamides, and traces of thiooleamides and thioarachidamides. These amides, of course, are all substituted on the amido nitrogen by the radical of the amine used.

The process of the present invention results in many inventively new products. Of these, the present application is concerned with certain of the compounds of types (1) and (2) hereinbefore referred to, which may be considered as derived from monocarbothionic acids. They may be defined as secondary monocarbothionamides in which the thioamide nitrogen substituent has at least four carbons, and is united to the amido nitrogen by aliphatic carbon. The thioamide nitrogen substituent is the substituent on the thioamido nitrogen, i. e., the radical obtained from the parent amine by subtracting the primary amino group or groups. The products may be comprehensively formulated as $$(R^3-CS-NH)_xR^4$$

in which $R^3$ is the residue of a monocarbothionic acid, and is joined to the thiocarbonyl group through carbon, $R^4$ is the thioamido nitrogen substituent as just defined, and $x$ is the valence of $R^4$. Preferably $R^4$ is a saturated hydrocarbon radical. When $x=1$, the formula reduces to $$R^3-CS-NH-R^4$$

i. e., to the formula for products obtained from monoamines.

The secondary amides of monocarbothionic acids and of saturated hydrocarbon monoamines of at least four carbon atoms, of which N-isobutylthiobenzamide and N-isobutylthiocaprylamide are typical, are stable high-boiling oils or low-melting solids which have practically no odor, a property which is a decided advantage when the compounds are to be used as insecticides or as metal deactivators for gasoline. The fact that they are in most cases liquids or low-melting solids facilitates their solubility in organic solvents. They are strikingly different in these respects from α,α-dicarbethoxy-N-allylthioacetamide and the diamide of α,α-dicarboxy-N-allylthioacetamide, which are high-melting, easily decomposed solids and hence of little practical use, and from N-allylthioacetamide and N-allylthiopropionamide, which are liquids that readily decompose and possess a garlic-like odor.

The secondary monocarbothionamides with which the present application is concerned as products are useful as metal deactivators for gasoline, as insecticides, and as plasticizers in compositions for moistureproofing regenerated cellulose sheeting.

The above description and examples are intended to be illustrative only. Any modification of or variation therefrom which conforms to the spirit of the invention is intended to be included within the scope of the claims.

I claim:

1. Process for preparing thioamides which comprises reacting hydrogen sulfide with a nitrile and with an amine having at least one primary amino group attached to an aliphatic carbon atom, the reacting groups being separated by a chain of at least two contiguous carbon atoms when the reactants are polyfunctional.

2. Process for preparing thioamides which comprises reacting hydrogen sulfide with a nitrile and with an amine having at least one primary amino group attached to an aliphatic carbon atom, the reacting groups being separated by a chain of at least two contiguous carbon atoms when the reactants are polyfunctional and by a chain of at least three carbon atoms in the case of a polyfunctional nitrile reactant.

3. Process for preparing thioamides which comprises reacting hydrogen sulfide with a mononitrile and with an amine having at least one primary amino group attached to an aliphatic carbon atom, and separated by a chain of at least two carbons from any other reacting group.

4. Process for preparing thioamides which comprises reacting hydrogen sulfide with a mononitrile and with a primary saturated aliphatic hydrocarbon monoamine of at least four carbon atoms.

5. Process as set forth in claim 2, which is carried out in the presence of an inert solvent for the reactants.

6. Process as set forth in claim 2, the temperature being in the range of from 50 to 250° C.

7. Process as set forth in claim 2, in which the reaction is carried out in an inert solvent at a temperature of from 50 to 250° C., and is continued until the evolution of ammonia has substantially ceased.

8. A secondary monocarbothionamide in which the thioamido nitrogen substituent has at least four carbon atoms and is united to said nitrogen by an aliphatic carbon atom.

9. A thioamide of the formula $$(R^3-CS-NH)_xR^4$$

in which $R^3$ is the residue of a monocarbothionic acid and is joined to the thiocarbonyl group through carbon, $R^4$ is a radical of at least four carbons which is united to the thioamido nitrogen by aliphatic carbon, and $x$ is the valence of $R^4$.

10. A thioamide of the formula $$R^3-CS-NH-R^4$$

in which $R^3$ is the residue of a monocarbothionic acid and is joined to the thiocarbonyl group through carbon, and $R^4$ is a radical of at least four carbons which is united to the thioamido nitrogen atom by an aliphatic carbon atom.

11. A thioamide of the formula $$R^3—CS—NH—R^5$$

in which $R^3$ is the residue of a monocarbothionic acid and is joined to the thiocarbonyl group through carbon, and $R^5$ is a saturated aliphatic hydrocarbon radical of at least four carbon atoms.

WILLIAM EDWARD HANFORD.